United States Patent [19]

Senoo

[11] 4,426,553
[45] Jan. 17, 1984

[54] VEHICLE LOUDSPEAKER ARRANGEMENT WITH MAGNETIC-FIELD-SENSITIVE DEVICE

[75] Inventor: Tetsuo Senoo, Inagi, Japan

[73] Assignee: Nissan Motor Company, Limited, Kanagawa, Japan

[21] Appl. No.: 398,657

[22] Filed: Jul. 15, 1982

[30] Foreign Application Priority Data

Jul. 31, 1981 [JP] Japan .............................. 56-119237

[51] Int. Cl.$^3$ ............................................. H04R 9/06
[52] U.S. Cl. ........................... 179/117; 179/115.55 F; 179/115.5 PS; 307/101
[58] Field of Search ............. 179/115.5 PS, 115.55 F, 179/120, 1 VE; 307/101, 10 R

[56] References Cited

FOREIGN PATENT DOCUMENTS 688714 6/1964 Canada ..................... 179/115.5 SF Primary Examiner—G. Z. Rubinson
Assistant Examiner—James L. Dwyer
Attorney, Agent, or Firm—Lowe, King, Price & Becker

[57] ABSTRACT

A loudspeaker arrangement for a vehicle having a magnetic-field-sensitive device, includes a casing, and first and second loudspeakers disposed in the casing. First and second magnets are incorporated in the first and second loudspeakers respectively. The respective magnetic moments of the first and second magnets are arranged to be antiparallel so that the vector sum of magnetic fluxes produced by the first and second magnets will be reduced at the position of the magnetic-field-sensitive device.

5 Claims, 4 Drawing Figures

VEHICLE LOUDSPEAKER ARRANGEMENT WITH MAGNETIC-FIELD-SENSITIVE DEVICE

BACKGROUND OF THE INVENTION

This invention relates to a loudspeaker arrangement for a vehicle having a magnetic-field-sensitive device, such as an azimuth or travel-direction sensor utilizing the geomagnetic field.

It is known to equip a vehicle with an azimuth sensor to indicate the direction of travel thereof. Generally, the azimuth sensor utilizes the geomagnetism as a reference to determine the orientation of the vehicle, and is sensitive to magnetic fields.

Some vehicles have audio systems with dynamic loudspeakers in the passenger's compartment. The permanent magnet of the loudspeaker generates a magnetic field, the magnitude of which is roughly comparable to that of geomagnetism.

For a vehicle with both an azimuth sensor and an audio system, it is conventional to provide an magnetically opaque plate between them to reduce magnetic coupling between the loudspeaker magnets of the audio system and the azimuth sensor. However, the opaque plate requires a large space and a complicated arrangement involving both the azimuth sensor and the audio system.

SUMMARY OF THE INVENTION

It is an object of this invention to provide a loudspeaker arrangement for a vehicle having a magnetic-field-sensitive drive which reduces magnetic coupling between loudspeakers and the device and which is compact.

In accordance with this invention, a loudspeaker arrangement for a vehicle having a magnetic-field-sensitive device, includes a casing, and first and second loudspeakers disposed in the casing. First and second magnets are incorporated in the first and second loudspeakers respectively. The respective magnetic moments of the first and second magnets are arranged to be antiparallel so that the vector sum of magnetic fluxes produced by the first and second magnets will be reduced at the position of the magnetic-field-sensitive device.

The above and other objects, features and advantages of this invention will be apparent from the following description of preferred and alternative embodiments thereof, taken in conjunction with the drawings.

DESCRIPTION OF THE PREFERRED EMBODIMENTS

Figure 1:
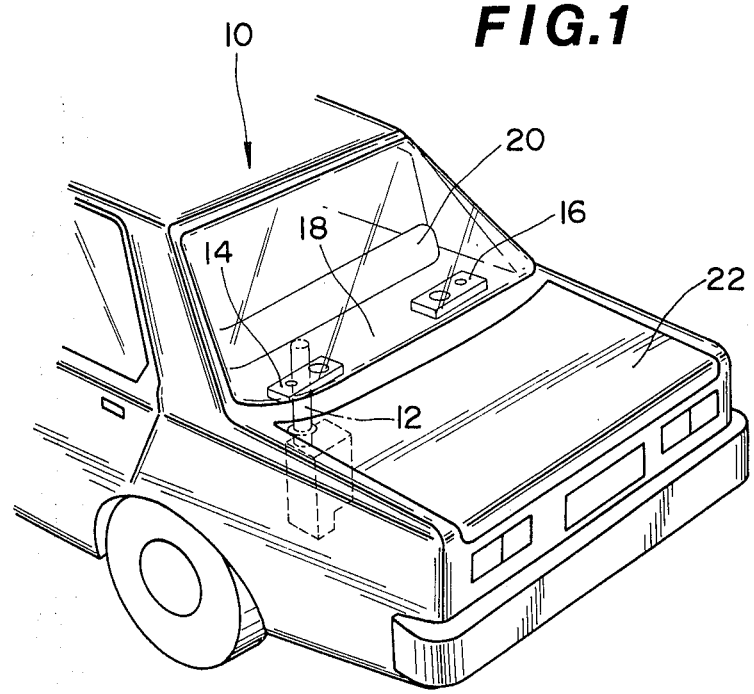
FIG. 1 is a perspective view of a vehicle equipped with a loudspeaker arrangement according to a first embodiment of this invention.

With reference to FIG. 1, there is shown a loudspeaker arrangement for a vehicle 10 having a magnetic-field-sensitive device 12, an azimuth sensor in this case, according to a first embodiment of this invention.

The arrangement includes a pair of loudspeaker boxes or units 14 and 16, which are mounted approximately on the ends of a laterally-extending vehicle rear parcel shelf 18, respectively, behind a vehicle seat back 20.

The device 12, the azimuth sensor in this embodiment, is located in one of the forward corners of a vehicle trunk. The azimuth sensor 12 is designed in a known manner and has a geomagnetic field sensing coil, utilizing the geomagnetic field to determine the direction of travel of the vehicle or the azimuth thereof. A trunk lid 22 at the rear of the parcel shelf 18 has an aperture at a position directly above the sensing coil of the sensor 12. When the sensor 12 is operated, the sensing coil is raised out of the aperture of the trunk lid by means of a mechanism similar to that used in a well-known power antenna system of a car radio to automatically drive the antenna. When the sensor 12 is at rest, the sensing coil is housed in the trunk. The azimuth sensor 12 may be similar to that disclosed in U.S. Pat. application Ser. No. 305,349, filed on Sept. 23, 1981, entitled "A Vehicle Orientation Detecting Device For An Automotive Vehicle Or Another Vehicle".

Figure 2:
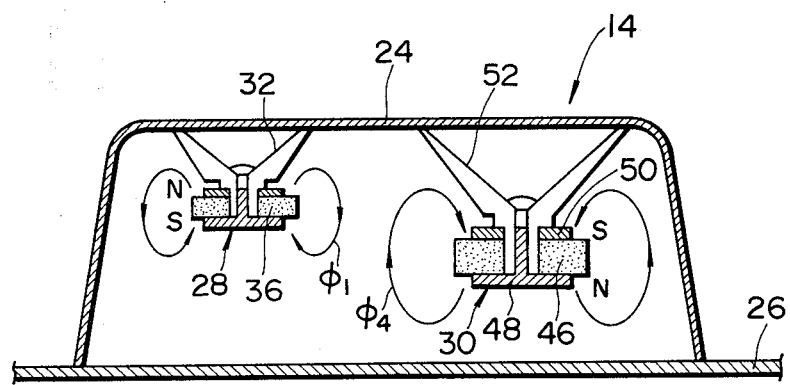
FIG. 2 is a vertical sectional view of the loudspeaker unit of FIG. 1.

As shown in FIG. 2, the loudspeaker unit 14 includes a box-like casing 24, which has an opening and is attached to a rear parcel shelf panel 26 in such a manner that the panel 26 closes the opening of the casing 24. Thus, the casing 24 and the panel 26 define an enclosed space inside the casing 24. The unit 14 includes a pair of dynamic loudspeakers 28 and 30 disposed within the casing 24 and attached to the top wall of the casing 24.

Figure 3:
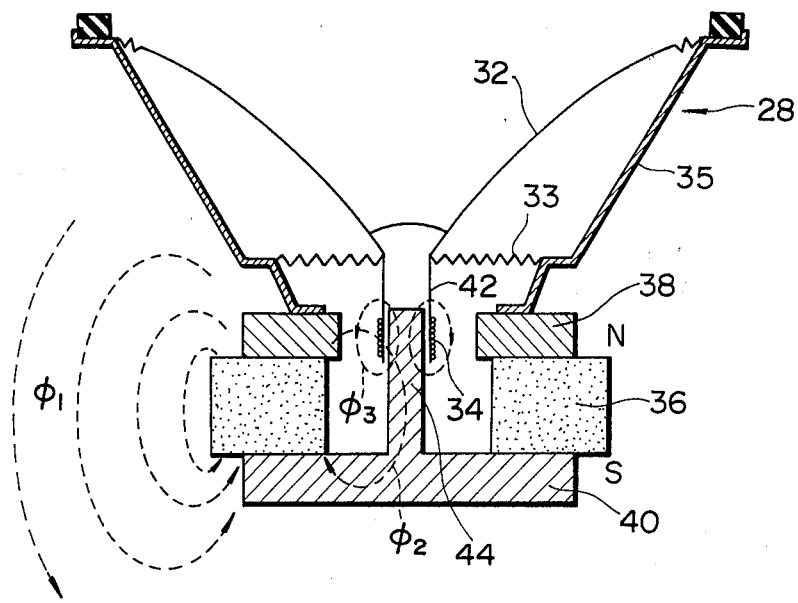
FIG. 3 is a sectional view of a loudspeaker, used in the arrangement of FIG. 1, taken along the axis of the loudspeaker.

As shown in FIG. 3, the loudspeaker 28 has a cone 32, a voice coil 34, and a ring-shaped permanent ferrite magnet 36. The cone 32 is vibratably, coaxially supported, by an annular member 33, on and within a hollow truncated-cone-shaped frame 35. The magnet 36 is coaxially sandwiched between a ring 38 and a disk 40. The flat surfaces of magnet 36 are of opposite magnetic poles or polarities with respect to one another. The ring 38 is attached to the north pole surface of the magnet 36. The disk 40 is attached to the south pole surface of the magnet 36. The ring 38 is coaxially attached to the truncated end of the frame 35 in such a manner as to be sandwiched between the frame 35 and the magnet 36. The vertex end of the cone 32 has an coaxial sleeve 42 extending through the central hole of the ring 38. The disk 40 has a central projection 44 coaxially extending through the magnet 36 into the sleeve 42. The voice coil 34 is wrapped around the sleeve 42 at a position substantially centered within the ring 38 and where the sleeve 42 and the projection 44 overlap.

The magnet 36 produces conceptual magnetic field lines or magnetic fluxes $\phi_1$ and $\phi_2$ "starting" from the north pole and "ending" at the south pole substantially via the outside and inside the set of the loudspeaker 28 respectively. The magnetic flux $\phi_2$ runs through the ring 38 and the disk 40. When voice current flows in the voice coil 34, magnetic flux $\phi_3$ are generated around the voice coil 34, vibrating the cone 32.

Returning to FIG. 2, the loudspeaker 30 is designed in a manner similar to that of the loudspeaker 28 except for the following design changes. The loudspeaker 30 is larger than the loudspeaker 28. The loudspeaker 28 is a tweeter for high-pitched tone, while the loudspeaker 30 is a woofer for low-pitched tone. A magnet 46 of the loudspeaker 30 is inverted with respect to that of the loudspeaker 28. In other words, the north and south pole surfaces of the magnet 46 of the loudspeaker 30 are attached to a disk 48 and a ring 50, respectively. Thus, the magnets of the loudspeakers 28 and 30 have opposite polarities or magnetic moments.

The loudspeakers 28 and 30 are attached to the top wall of the casing 24 in such a manner that the cones 32 and 52 thereof face the top wall. Thus, the loudspeakers 28 and 30 are arranged parallel to each other. As a result, the polarities or magnetic moments of the magnets 36 and 46 in the loudspeakers 28 and 30 are antiparallel. The top wall of the casing 24 has openings at positions opposing the loudspeaker cones 32 and 52 in order to transmit tones from the cones to the outside of the casing 24. In order to keep the vibrations of the loudspeaker cones in phase, the voice coils of the loudspeakers 28 and 30 are connected to a voice current generating source in the opposite polarities respectively. Instead of this arrangement in the connections of the voice coils to the voice current source, directions in which the respective voice coils are wound may be opposite to each other.

Since the polarities or magnetic moments of the magnets 36 and 46 are antiparallel, magnetic flux $\phi_1$ produced by the magnet 36 and magnetic flux $\phi_4$ of similar type produced by the magnet 46 partially cancel each other. As a result, the vector sum or resultant of the magnetic fluxes $\phi_1$ and $\phi_4$ travelling to the azimuth sensor 12 is remarkably reduced in comparison with the conventional case in which the polarities or magnetic moments of the magnets are in the same direction, even though the loudspeaker unit 14 is relatively near the azimuth sensor 12. Therefore, the interference of the magnets 36 and 46 with the geomagnetic field is also reduced, so that the azimuth sensor 12 can accurately detect the direction of travel or the azimuth of the vehicle 10.

The loudspeaker unit 16 is designed in a manner similar to that of the previously described unit 14 except for the following point: the right/left positions of the loudspeakers in the unit 16 are reversed with respect to those positions of the loudspeakers in the unit 14.

Figure 4:
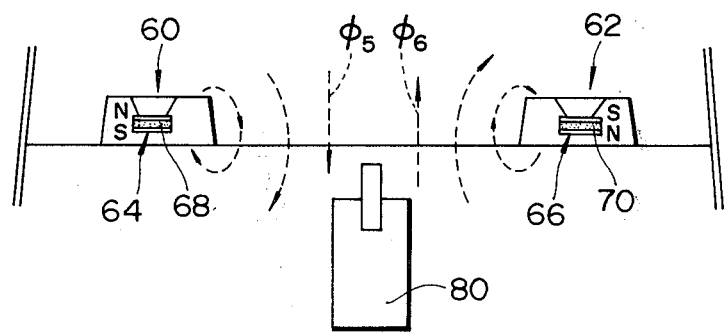
FIG. 4 is a diagrammatic view of a loudspeaker arrangement according to a second embodiment of this invention.

FIG. 4 shows a loudspeaker arrangement according to a second embodiment of this invention. This arrangement has a pair of loudspeaker units 60 and 62 located as described in the previous first embodiment. The unit 60 has a single loudspeaker 64 designed similar to the loudspeaker 28 in the unit 14 of the previous first embodiment. The unit 62 has also a single loudspeaker 66 designed similar to the loudspeaker 30 in the unit 14 of the first embodiment. The loudspeaker 64 and 66 are of equal size, and are arranged parallel to each other. Thus, the polarity or magnetic moment of magnet 68 in the loudspeaker 64 is antiparallel to that of magnet 70 in the loudspeaker 66.

An azimuth sensor 80 is mounted in a vehicle trunk at a position essentially equidistant from the loudspeaker units 60 and 62. Since the polarities or magnetic moments of the magnets 68 and 70 in the loudspeakers 64 and 66 are antiparallel, magnetic flux $\phi_5$ and $\phi_6$ produced by the magnets 68 and 70 respectively cancel at positions equidistant from the magnets. As a result, the vector sum or resultant of the magnetic fluxes $\phi_5$ and $\phi_6$ reaching the azimuth sensor 80 is remarkably reduced, so that the sensor 80 can accurately detect the azimuth or the travel-direction of the vehicle.

It should be understood that further modifications and variations may be made in this invention without departing from the spirit and scope of this invention as set forth in the appended claims. For example, this invention can be applied to a loudspeaker unit having a set of three loudspeakers, i.e. woofer, squawker, and tweeter. In this case, the polarity or magnetic moment of the magnet in the woofer is arranged antiparallel to those of the magnets in the other loudspeakers, and the squawker and the tweeter are located on the opposite sides of the woofer. The reason for this arrangement is that the magnet in the woofer is stronger than the magnets in the other loudspeakers.

What is claimed is:

1. A loudspeaker arrangement for a vehicle having a magnetic-field-sensitive device, comprising:
   (a) a casing;
   (b) first and second loudspeakers disposed in the casing; and
   (c) first and second magnets incorporated in the first and second loudspeakers respectively, the respective magnetic moments of the first and second magnets being antiparallel so that the vector sum of magnetic fluxes produced by the first and second magnets will be reduced at the position of the magnetic-field-sensitive device.

2. A loudspeaker arrangement as recited in claim 1, wherein the first and second loudspeakers have first and second vibrating cones respectively which are parallel to each other.

3. A loudspeaker arrangement as recited in claim 1, wherein the first and second loudspeakers are tweeter and woofer respectively.

4. A loudspeaker arrangement for a vehicle having a magnetic-field-sensitive device, comprising:
   (a) first and second loudspeaker units;
   (b) first and second loudspeakers disposed in the first and second units respectively; and
   (c) first and second magnets incorporated in the first and second loudspeakers respectively, the respective magnetic moments of the first and second magnets being antiparallel so that the vector sum of magnetic fluxes produced by the first and second magnets will be reduced at the position of the magnetic-field-sensitive device.

5. A loudspeaker arrangement as recited in claim 4, wherein the first and second loudspeaker units are located relative to the magnetic-field-sensitive device in such a manner that the device is essentially equidistant from the two units.

* * * * *